A. HANSON.
QUACK GRASS DESTROYER.
APPLICATION FILED JUNE 5, 1917.
1,261,521.
Patented Apr. 2, 1918.
4 SHEETS—SHEET 1.
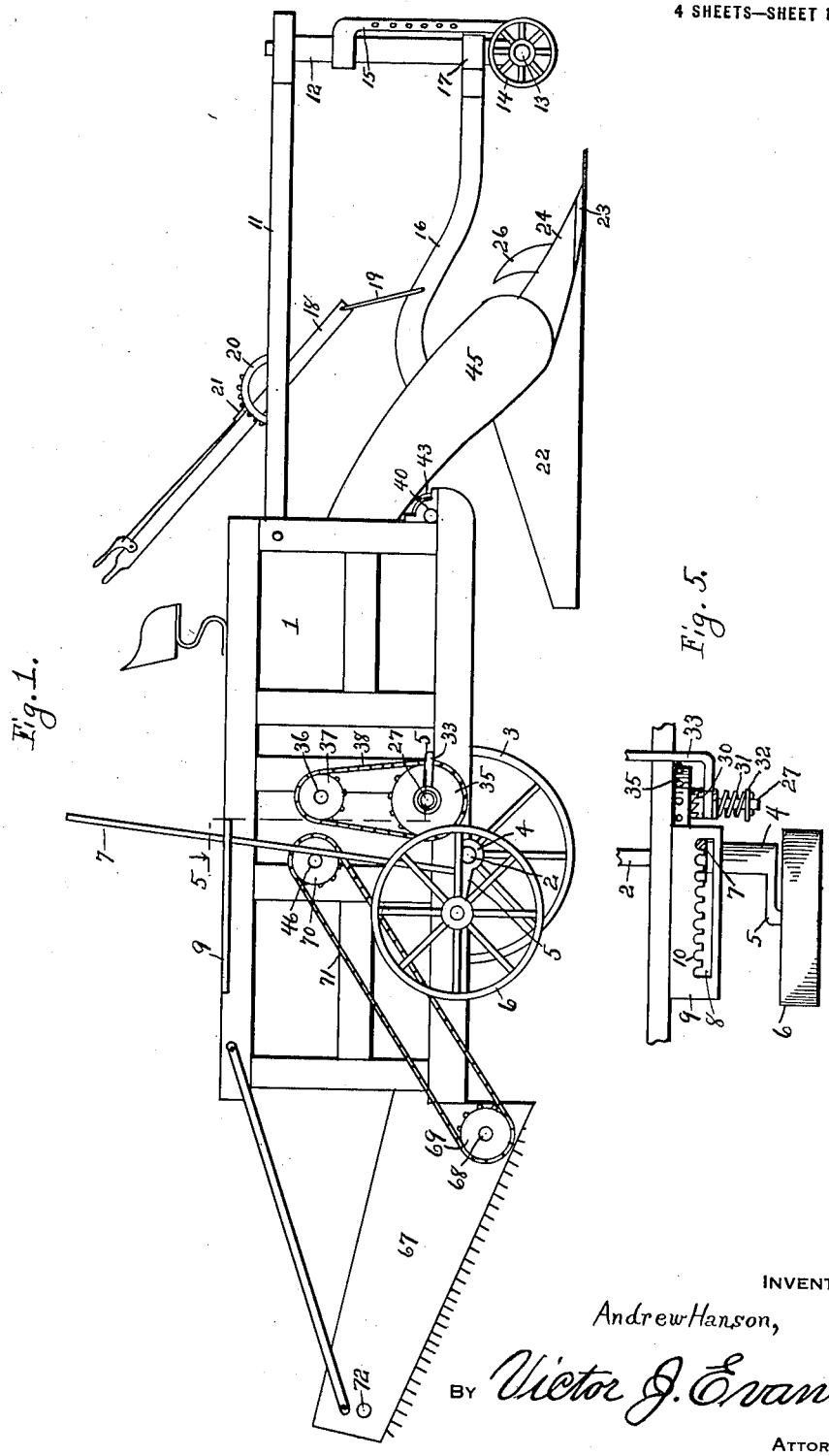
INVENTOR
Andrew Hanson,
BY Victor J. Evans
ATTORNEY A. HANSON.
QUACK GRASS DESTROYER.
APPLICATION FILED JUNE 5, 1917.
1,261,521.
Patented Apr. 2, 1918.
4 SHEETS—SHEET 2.
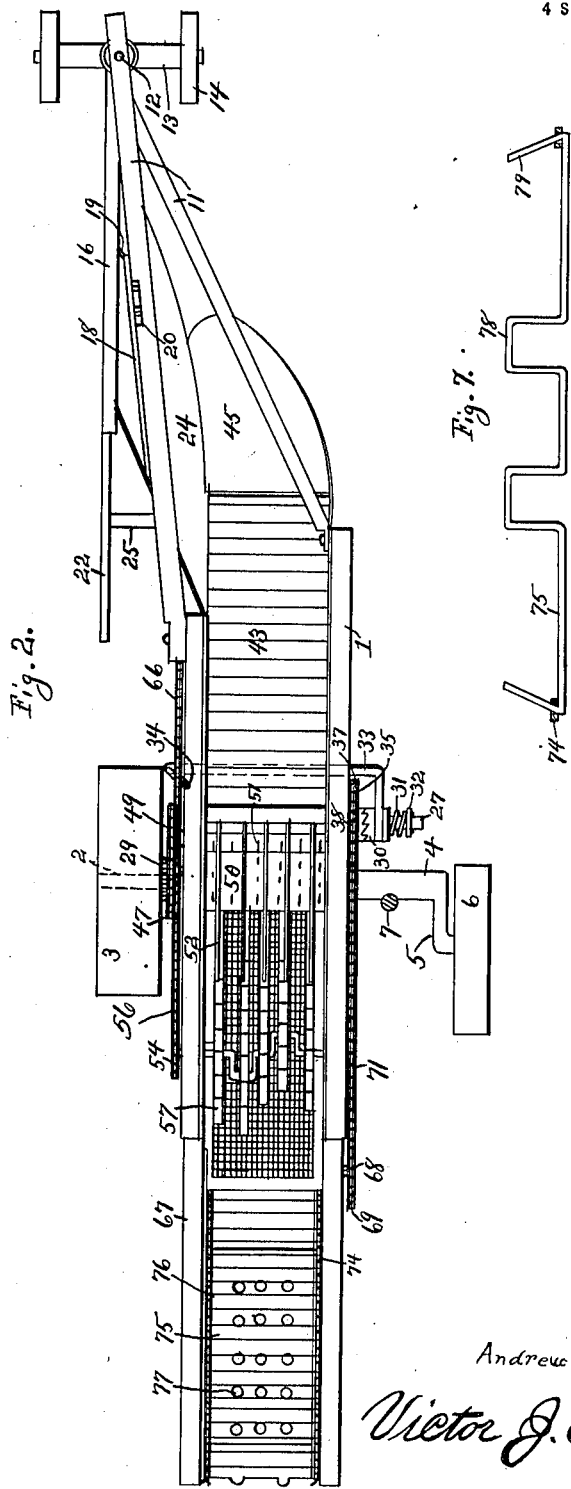
INVENTOR
Andrew Hanson, By
Victor J. Evans
ATTORNEY

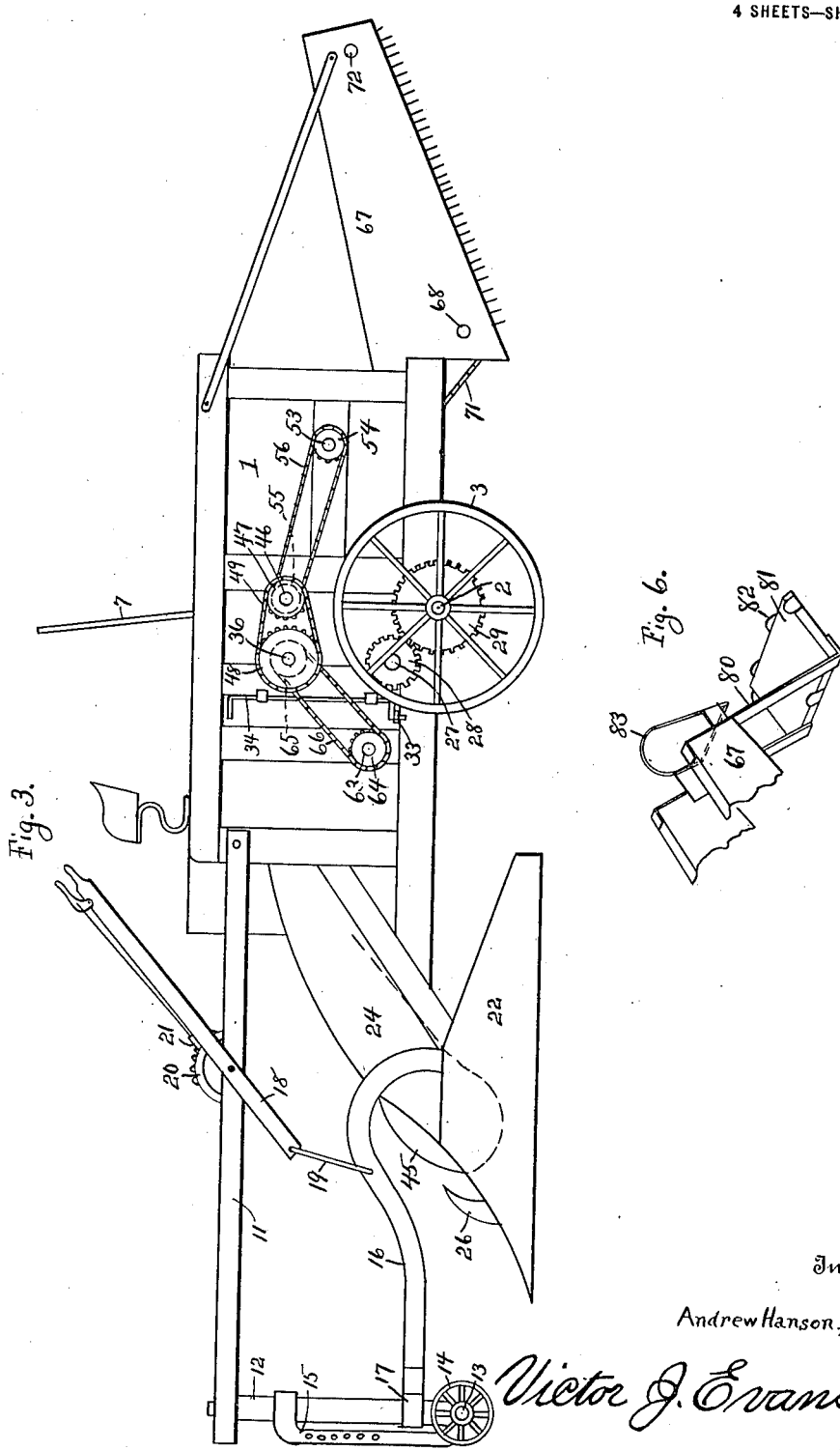

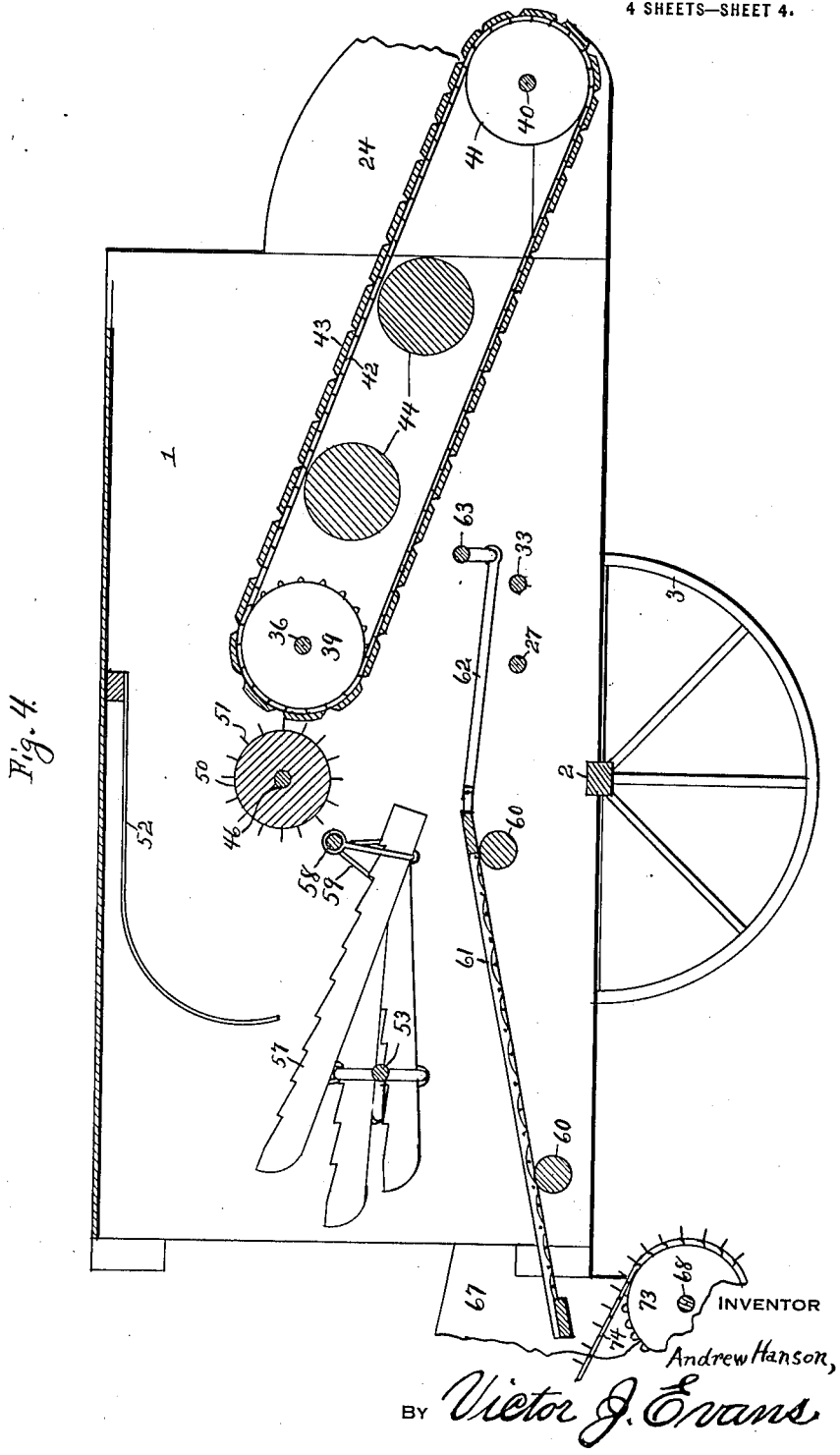

UNITED STATES PATENT OFFICE.

ANDREW HANSON, OF CLAYTON, WISCONSIN.

QUACK-GRASS DESTROYER.

1,261,521.  Specification of Letters Patent.  Patented Apr. 2, 1918.

Application filed June 5, 1917. Serial No. 173,003.

*To all whom it may concern:*

Be it known that I, ANDREW HANSON, a citizen of the United States, residing at Clayton, in the county of Polk and State of Wisconsin, have invented new and useful Improvements in Quack-Grass Destroyers, of which the following is a specification.

This invention relates to machines especially adapted to be used for destroying quack and similar grasses and it consists in the novel features hereinafter described and claimed.

An object of the invention is to provide a machine of the character stated which is of simple and durable structure and which includes features adapted to plow and remove the grass from the soil and cast the same upon an elevator which is mounted for movement in a casing. A reel is journaled in the casing and adapted to receive the grass from the same and a series of bars is mounted for longitudinal movement in the casing and adapted to receive the material from the reel. Hooks are located in the casing above the reel and the bars and are adapted to direct the material in a downward direction upon the bars. A screen is mounted for reciprocatory movement below the bars and any sand or soil which is shaken from the plants by the action of the reel and bars may sift through the screen while the smaller particles of grass will pass down along the same. An elevator is mounted for movement behind the casing and is adapted to receive the material therefrom and carry the same up and discharge it into a bag or other receptacle. After the grass is collected as above indicated it is carried to a point at or beyond the border of the field where it is destroyed by burning or otherwise. By providing such a machine all of the particles of grass are removed from the soil including the stems, vines, roots, leaves, etc.

In the accompanying drawing:—

Figure 1 is a side elevation of the quack grass destroying machine.

Fig. 2 is a top plan view of the same.

Fig. 3 is a side elevation of the same looking at the opposite side from that shown in Fig. 1.

Fig. 4 is a vertical longitudinal sectional view of the casing of the machine.

Fig. 5 is a detailed sectional view cut on the line 5—5 of Fig. 1.

Fig. 6 is a perspective view of a bag support which may be attached to the machine.

Fig. 7 is a side view of a bar used in the conveying machine for conducting the grass out of the machine.

The quack grass destroyer comprises a casing 1 which is supported at its intermediate portion upon a transversely disposed axle 2. A wheel 3 is journaled upon one end of the axle 2 and is adapted to travel in the furrow which is opened by a plow as hereinafter described. A sleeve 4 is turnably mounted upon that end of the axle 2 which is opposite the end thereof that carries the wheel 3 and the said sleeve is provided with a crank portion 5 upon which a wheel 6 is journaled. The wheel 6 is less in diameter than the wheel 3 and is adapted to travel upon the surface of the soil or ground. A flexible lever 7 is secured at its lower end to the side of the sleeve 4 and the intermediate portion of the said lever 7 passes through a slot 8 provided in a plate 9 which is attached to the upper portion of the casing 1 and at the side thereof. The said plate 9 is provided at the inner edge of the slot 8 with a series of notches 10, any one of which may receive the intermediate portion of the lever 7. The lever 7 is normally received in one of the said notches but when it is desired to turn the sleeve 4, the lever 7 is forced out of the notches and may then be swung longitudinally of the casing whereby the sleeve 4 is turned and the wheel 6 raised or lowered. When the wheel 6 is at a desired position the lever 7 is released and it springs back into engagement with one of the notches 10 whereby the parts are held at the adjusted position.

Bars 11 are pivotally connected at their rear ends with the opposite side portions of the casing 1 as best illustrated in Fig. 2 of the drawing and these bars converge toward each other at their forward ends. One of the said bars 11 attaches with the other bar 11 at a point behind the forward end thereof and both of the said bars extend obliquely and have their forward ends disposed beyond that side of the casing 1 at which the wheel 3 is located. The forward end of the longer bar 11 is pivoted upon a vertical standard 12 and the standard 12 carries at its lower end an axle 13 upon which wheels 14 are journaled, and the said wheels are adapted to travel over the surface of the soil. A clevis support 15 is connected with the standard 12 in a suitable manner and a clevis may be adjustably secured to the said support for the purpose of attaching a draft appliance. A plow beam 16 is provided at its forward end with a sleeve 17 which slidably receives the intermediate portion of the standard 12. A lever 18 is fulcrumed upon the longer bar 11 and its forward end is connected with the beam 16 by means of a link 19. A dentate segment 20 is mounted on the bar 11 adjacent the lever 18 and the said lever carries a pawl 21 which is adapted to engage between the teeth of the segment 20 and hold the lever at an adjusted position. Inasmuch as the wheels 14 and the beam 16 travel upon the surface of the soil, and the wheels 3 travel in a furrow when the rear end of the lever 18 is swung in a downward direction, the sleeve 17 moves in an upward direction along the standards 12 and the bars 11 swing slightly upon pivotal connections with the casing. This means may be used for raising or lowering the beam 16. A plow is carried at the rear end of the beam 16 and the said plow includes a land side plate 22 having a share 23 at its forward end and supporting at its upper edge a mold board 24. The said mold board is extended upwardly and rearwardly and its rear end portion is attached to the front portion of the casing 1 at one side thereof and best shown in Fig. 2 of the drawing.

A brace 25 is interposed between the rear portion of the land side plate 22 and the frame of the casing and serves to steady the rear portion of the said land side plate. As hereinbefore described the wheel 3 is adapted to travel in the furrow which is opened by the plow attached to the beam 16. A colter blade 26 is carried at the forward portion of the land side plate.

A transversely disposed shaft 27 is journaled in the lower intermediate portion of the casing 1 and carries at one end a gear wheel 28 which meshes with a gear wheel 29 fixed with relation to the wheel 3. A clutch member 30 is slidably mounted on the shaft 27 and a spring 31 bears at one end against the said clutch member and at its other end against a collar 32 mounted on the shaft 27. A rod 33 passes transversely through the lower portion of the casing 1 and one end of the said rod is operatively connected with the clutch member 30 as best shown in Fig. 5 of the drawing. A crank shaft 34 is journaled at the side of the casing 1 and its crank is operatively connected with the other end of the rod 33. It is obvious that by turning the crank 34 the rod 33 may be moved whereby the clutch member 30 may be moved toward or against the tension of the spring 31. A sprocket wheel 35 is loosely mounted on the shaft 27 and its hub is adapted to be engaged by the clutch member 30 when the same is forced in an inward direction under the influence of the spring 31 whereby the said wheel 35 is caused to rotate with the shaft 27. A shaft 36 is journaled at the intermediate portion of the casing 1 at a point above the shaft 27 and carries at one end a sprocket wheel 37. A sprocket chain 38 is trained around the wheels 35 and 37 and is adapted to transmit rotary movement from the shaft 27 to the shaft 36. Sprocket wheels 39 are mounted upon the shaft 37 and are located between the sides of the casing 1. A shaft 40 is journaled at the lower forward portion of the casing 1 and carries wheel 41. Chains 42 are trained around the wheels 39 and 41 and carry cross slats 43. Rollers 44 are journaled in the casing 1 and are located under the upper runs of the chains 42 and serve to prevent the same from sagging when material is dumped upon the upper run of the conveyer of which the said chains are a part. A fender 45 is connected with one end of the casing 1 and extends along the rear portion of the mold board 24 and at the edge thereof and is adapted to receive material from the mold board and direct it upon the slats 43 as they move over the wheels 41. A shaft 46 is journaled in the casing 1 at a point behind the shaft 36 and carries at one end a sprocket wheel 47. A sprocket wheel 48 is mounted on the shaft 36 and a chain 49 is trained around the sprocket wheels 47 and 48 and is adapted to transmit rotary movement from the shaft 36 to the shaft 46.

A reel 50 is carried by the shaft 46 and is located between the sides of the casing 1. The said reel is provided at its periphery with a number of outstanding radially disposed pins 51 which are adapted to receive the material from the slats 43 and cast the same rearwardly. A series of hooks 52 is located in the casing 1 above the reel 50 and the free ends of the said hooks are rearwardly and downwardly disposed. Any material which flies or is cast from or which is cast back by the pins 51 and the body of the reel 50 and which strikes the hooks 52 will be directed downwardly. A crank bar shaft 53 is journaled in the rear portion of the casing 1 and carries at one end a sprocket wheel 54. A sprocket wheel 55 is mounted upon the shaft 46 adjacent the sprocket wheel 47 and a sprocket chain 56 is trained around the sprocket wheels 54 and 55. The said chain is adapted to transmit rotary movement from the shaft 46 to the shaft 53. Rack bars 57 are pivoted at points between their ends upon the cranks of the shaft 53 and the forward portions of the said rack bars 57 are connected with a shaft 58 by means of links 59. As the shaft 53 rotates the bars 57 are moved longitudinally and their rear ends are sprung in an upward direction. The said bars 57 receive the material which is cast rearwardly by the wheels 50 and directed down by the hooks 52.

Rollers 60 are journaled in the lower rear portion of the casing 1 at different elevations and a screen 61 rests upon the upper portions of the said rollers 60. A rod 62 is connected with the forward portion of the screen 61 and with the crank of a crank shaft 63 which is journaled in the casing 1 under the chains 42. A sprocket wheel 64 is mounted upon the shaft 63 and a sprocket wheel 65 is mounted upon the shaft 36. A sprocket chain 66 is trained around the sprocket wheels 64 and 65 and is adapted to transmit rotary movement from the shaft 36 to the shaft 63. A frame 67 is carried at the rear end of the casing 1 and a shaft 68 is journaled at the forward portion of the frame 67. A sprocket wheel 69 is fixed to one end of the shaft 68 and a sprocket wheel 70 is fixed to the shaft 46. A sprocket chain 71 is trained around the sprocket wheels 69 and 70 and is adapted to transmit rotary movement from the shaft 46 to the shaft 68. A shaft 72 is journaled at the upper rear edge of the frame 67. Sprocket wheels 73 are mounted upon the shafts 68 and 72 and chains 74 are trained around the said sprocket wheels. The chains 74 carry cross bars 75 which are adapted to move over a partition 76 mounted in an inclined position in the frame 67. The said partition 76 is provided with a suitable number of openings 77. The material which falls from the bars 57 and which lodges upon the screen 61 moves down along the screen and falls from the rear end thereof upon the bars 75. The said bars carry the material upwardly and rearwardly along the frame 67 and from the rear end of the frame the said material may be deposited in a bag or other receptacle as hereinafter described. The soil or sand which shifts from the material may fall to the ground through the openings in the screen 61 and also through the openings 77 in the partition 76.

As best shown in Fig. 7 of the drawing, the bars 75 are provided at points between their ends with upwardly disposed bends 78 which are adapted to more effectually engage the roots and stems of the grass; also the said bars are provided with inwardly inclined extremities 79 which are adapted to encounter the said material and prevent the same from moving laterally over the chains 74.

In Fig. 6 of the drawing a bag holder is shown and the same may be employed if desired. The said holder consists of strips 80 which are attached to the rear ends of the frame 67 and carry at their lower ends a platform 81. Lugs 82 are provided at the edges of the platform 81 and extend up beyond the upper surface thereof. An open center frame 83 is carried at the upper portions of the strips 80 and a mouth of a bag may be secured around the frame 83 in the usual manner. The bottom of the bag will rest upon the platform 81. Consequently as the material is carried in an upward direction and discharged from the end of the frame 67 it will be received in the mouth of the bag which is held open by the frame 83 and the said material will deposit in the body of the bag. Consequently the roots, stems, leaves and other parts of the plants are removed from the soil and collected in the bag. The material which is thus collected may be carried to a distant point and destroyed by burning or otherwise.

Having described the invention what is claimed is:—

1. A plant destroyer comprising a wheel mounted casing, a plow connected with the forward portion of the casing, a fender coöperating with the plow to direct material into the casing, an elevator located in the casing and adapted to receive the material from the fender, a reel journaled in the casing and having outstanding pins adapted to receive material from the elevator, hooks located over the reel, and a screen located below the reel and adapted to separate the soil from the grass and to permit the soil to gravitate to the ground and cast the grass rearwardly out of the casing.

2. A plant destroyer comprising a wheel mounted casing, a plow connected with the casing, a fender coöperating with the plow to direct material into the casing, an elevator adapted to receive material from the fender, a reel having outstanding pins and adapted to receive material from the elevator, hooks located over the reel, rack bars mounted for movement below the hooks and reel, and a screen mounted for movement below the rack bars.

3. A plant destroyer comprising a wheel mounted casing, a plow connected with the forward portion of the casing, means for raising and lowering the forward portion of the casing with relation to the ground, a fender coöperating with the plow to direct material rearwardly, an elevator located in the casing and adapted to receive material from the fender, a reel adapted to receive material from the elevator and having outstanding pins, rack bars mounted for movement below the reel, a screen mounted for movement below the rack bars, a frame attached to the casing and having an elevator located therein, a partition located in the frame and having openings, and means for operating the elevator in the frame from the supporting wheels of the casing.

In testimony whereof I affix my signature.

ANDREW HANSON.